(12) United States Patent
Kelkar et al.

(10) Patent No.: US 7,049,864 B2
(45) Date of Patent: May 23, 2006

(54) APPARATUS AND METHOD FOR HIGH FREQUENCY STATE MACHINE DIVIDER WITH LOW POWER CONSUMPTION

(75) Inventors: Ram Kelkar, South Burlington, VT (US); Pradeep Thiagarajan, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 62 days.

(21) Appl. No.: 10/710,115

(22) Filed: Jun. 18, 2004

(65) Prior Publication Data

US 2005/0280449 A1  Dec. 22, 2005

(51) Int. Cl.
*H03K 21/00* (2006.01)

(52) U.S. Cl. .......................... 327/115; 377/47
(58) Field of Classification Search ................. 327/115, 327/117; 377/47, 48
See application file for complete search history.

(56) References Cited

U.S. PATENT DOCUMENTS

| | | | |
|---|---|---|---|
| 5,339,345 A | 8/1994 | Mote, Jr. ...................... | 377/48 |
| 5,914,996 A | 6/1999 | Huang ......................... | 377/39 |
| 6,489,817 B1 | 12/2002 | Wong et al. ................. | 327/115 |
| 6,501,816 B1* | 12/2002 | Kouznetsov et al. .......... | 377/48 |
| 6,618,462 B1 | 9/2003 | Ross et al. .................... | 377/48 |
| 2002/0131190 A1 | 9/2002 | Groo ........................... | 360/51 |
| 2003/0048118 A1 | 3/2003 | Nguyen et al. ............. | 327/115 |
| 2005/0088210 A1* | 4/2005 | Chen .......................... | 327/115 |

OTHER PUBLICATIONS

Massoud Pedram, Qin Wu, and Xunwei Wu; "A New Design for Double Edge Triggered Flip-flops".

* cited by examiner

*Primary Examiner*—Linh My Nguyen
(74) *Attorney, Agent, or Firm*—Michael J. LeStrange; Cantor Colburn LLP

(57) ABSTRACT

A digital frequency divider apparatus includes a plurality of next-state generator elements receiving an input clock signal thereto, and configured to generate a next value for each of a corresponding plurality of internal state variables. A plurality of flip-flop elements is configured to store the generated next values for the plurality of internal state variables, the plurality of flip-flop elements further configured to provide a present value of the plurality of internal state variables to the next-state generator elements through a feedback path therebetween. The generated next values for the plurality of internal state variables are based upon the present values of the plurality of internal state variables and the input clock signal.

15 Claims, 14 Drawing Sheets

APPARATUS AND METHOD FOR HIGH FREQUENCY STATE MACHINE DIVIDER WITH LOW POWER CONSUMPTION

BACKGROUND OF INVENTION

The present invention relates generally to clocking circuitry for digital systems, and, more particularly, to a high frequency state machine divider having low power consumption.

In modern digital circuits and systems, such as digital signal processors for example, it is often advantageous to generate multiple clock signals of various frequencies from a smaller set of reference frequencies. Additionally, these applications may also call for each generated frequency to have no common factors with the other generated clock frequencies (i.e., the ratio of each generated frequency to the reference frequency might not share any prime factors with other generated frequencies). In many cases, it is also desirable that the generated frequencies be software or firmware controlled to accommodate different applications.

To date, many solutions exist that employ numerous analog circuits, such as voltage-controlled oscillators (VCO) and phase-locked loops (PLL). However, these circuits are costly to implement due to their relatively large size, power requirements, and sensitivity to electrical as well as physical design rules. In addition to these cumbersome and costly analog circuits, several current approaches allow for the generation of multiple clock frequencies using a single clock frequency as the input clock for multiple clock-dividers. In several of these systems, a clock divider may be easily constructed to divide a reference frequency by powers of two (i.e., $2^n$) or by integer values. However, the complexity of the system increases when the divisor is not a power of two, or even a non-integer value.

Digital division circuits, on the other hand, are often limited to division by even integers. Some digital dividers (which are capable of odd division) generate a clock signal that varies from a fifty percent duty cycle by one half of a clock cycle because odd division with a fifty percent duty cycle requires alternately aligning the generated clock to the rising and falling edges of the input clock. Other existing digital dividers capable of odd division that generate clock signals accurate to the proper half cycle may still compromise their duty cycle symmetry by using different clock signals to generate rising and falling edges or by using uneven numbers of gates in the logical paths which generate the rising and falling edges of the output clock.

Moreover, with the use of a conventional shift register technique for dividing an input clock signal, there are numerous latching elements (and therefore individual switching transistors) associated therewith, which increases overall current usage and power consumption. Given the continued reduced scaling of integrated circuit devices, it therefore is desirable to be able to implement a digital frequency divider architecture that may be used at high frequencies, but that consumes less power than conventional approaches.

SUMMARY OF INVENTION

The foregoing discussed drawbacks and deficiencies of the prior art are overcome or alleviated by a digital frequency divider apparatus. In an exemplary embodiment, the apparatus includes a plurality of next-state generator elements receiving an input clock signal thereto, and configured to generate a next value for each of a corresponding plurality of internal state variables. A plurality of flip-flop elements is configured to store the generated next values for the plurality of internal state variables, the plurality of flip-flop elements further configured to provide a present value of the plurality of internal state variables to the next-state generator elements through a feedback path therebetween. The generated next values for the plurality of internal state variables are based upon the present values of the plurality of internal state variables and the input clock signal.

In another embodiment, a digital frequency by N divider apparatus includes a plurality of next-state generator elements receiving an input clock signal thereto, and configured to generate a next value for each of a corresponding plurality of internal state variables. A plurality of flip-flop elements is configured to store the generated next values for the plurality of internal state variables, and to provide a present value of the plurality of internal state variables to the next-state generator elements through a feedback path therebetween. The generated next values for the plurality of internal state variables are based upon the present values of the plurality of internal state variables and the input clock signal. One or more of the next-state generator elements are further configured to generate a preactivated internal state variable prior to a transition from state X to state X+1, wherein during the transition at least one of the internal state variable changes, and at least one of the next values also changes as a result thereof.

In still another embodiment, a method for dividing the frequency of an input clock signal includes configuring a plurality of next-state generator elements to generate a next value for each of a corresponding plurality of internal state variables, and configuring a plurality of flip-flop elements for storing the generated next values for the plurality of internal state variables. The plurality of flip-flop elements are further configured to provide a present value of the plurality of internal state variables to the next-state generator elements through a feedback path therebetween, wherein the generated next values for the plurality of internal state variables are based upon the present values of the plurality of internal state variables and the input clock signal.

BRIEF DESCRIPTION OF DRAWINGS

Referring to the exemplary drawings wherein like elements are numbered alike in the several Figures.

DETAILED DESCRIPTION

Figure 1:
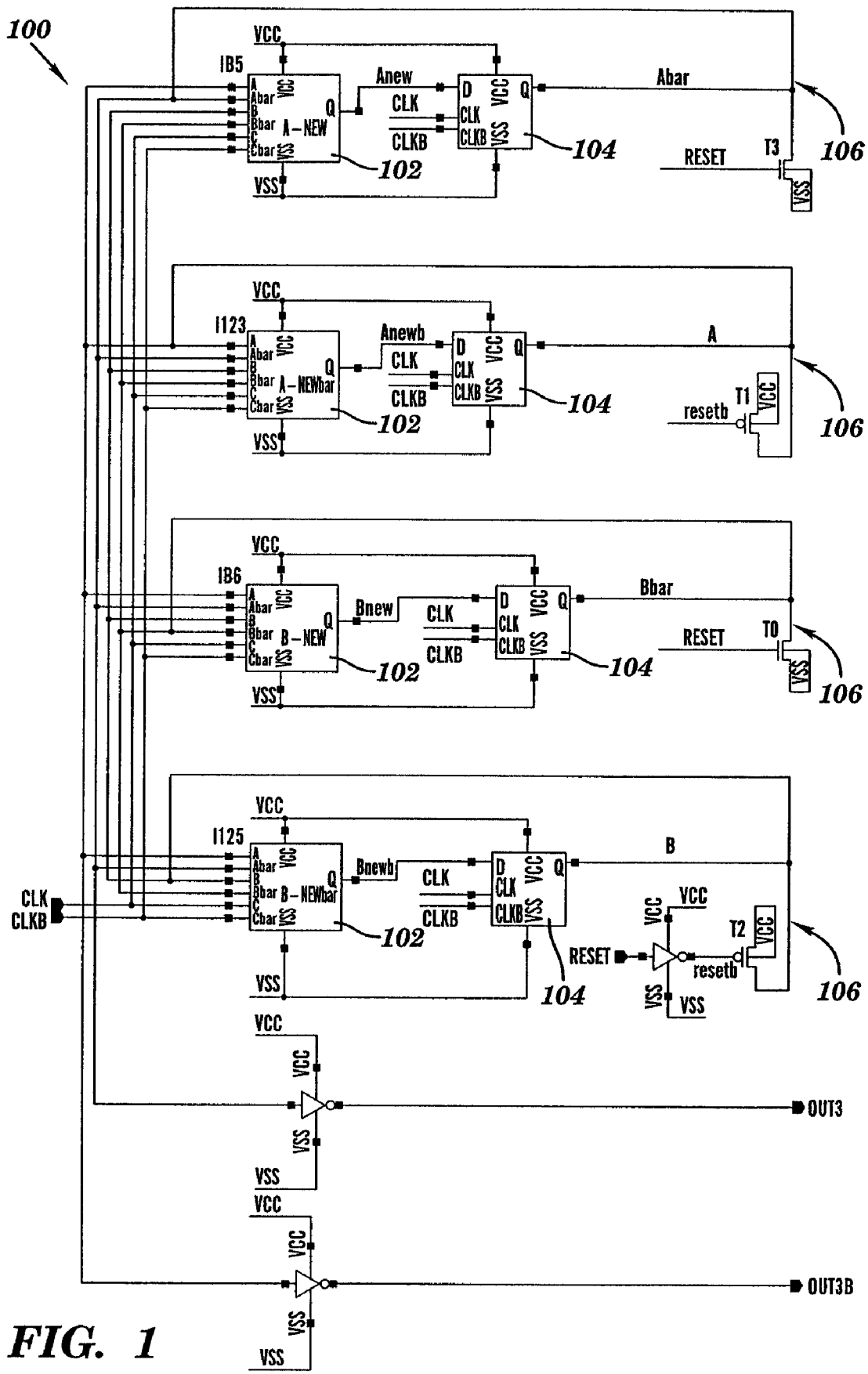
FIG. 1 is a schematic diagram of a frequency divider circuit in accordance with an embodiment of the invention.

Disclosed herein is a novel high frequency, low power divider circuit that can operate at speeds at least up to about 3 GHz using a supply voltage of about 1.2 volts. Generally speaking, the divider circuit utilizes a state machine approach using a clock signal (CLK) as an external input thereto, the input clock signal having the frequency to be divided by a desired integral number. The number of state variable inputs used in the divider circuit will depend upon the value of the divisor, N, for a "divide-by-N" frequency divider. Thus, given that there are 2N operating states for a divide-by-N frequency divider, the minimum number, X, of state variable inputs needed is the least value of X satisfying the expression $2N \leq 2^X$.

By way of example, for a divide-by-2 divider, there are 4 states associated therewith and thus 2 state variable inputs are required. A divide by 3 divider has 6 states associated therewith, and thus at least 3 state variable inputs are required. A divide by 4 divider has 8 states associated therewith, and may also be implemented using 3 state variable inputs. A divide by 7 divider has 14 states, and thus requires a minimum of 4 state variable inputs.

Referring initially to FIG. 1, there is shown a schematic diagram of a frequency divider circuit 100 in accordance with an embodiment of the invention. The divider circuit 100 includes a plurality of next-state generator elements 102 configured to generate the next value of the internal state variables, based on the current values of the internal state variables and the current value of the external clock input. In addition, for each next-state generator element 102, there is provided a double edge triggered, D flip-flop element 104 configured to store and subsequently release the new value of the state variables back to the input side of the next-state generator elements 102. Each next-state generator element 102 is further provided with an associated reset element 106 for setting the internal state variables (and their complements) to a desired initial value.

In the embodiment depicted, the frequency divider circuit 100 is a divide by 3 circuit. As such, there are a total of three state variables needed to represent the 6 different states. Since one of the state variables will be the external clock input, there are two internal state variables for the divide by 3 circuit, designated "A" and "B". Because the divider circuit utilizes the complements of each of the state variables, FIG. 1 therefore depicts a total of four next-state generator elements 102: one for generating the next value of "A" (A-New), one for generating the next value of the complement of "A" (A-New bar), one for generating the next value of "B" (B-New), and one for generating the next value of the complement of "B" (B-New bar).

Table 1 below illustrates one possible truth table implementation for the divide by 3 frequency divider circuit 100 of FIG. 1. It will be noted that the particular order of the values for the selected states (6 out of a possible 8) of the state variables (A, B, Clk) will affect the complexity of the logic used to generate the output function of a given next-state generator element 102. Thus, the order of the states is preferably arranged in a manner such that the output functions are least complex, using reduced variables as well as reduced AND/OR logic gates.

TABLE 1

| State | A | B | Clk | Anew | Bnew | Out3 | Out3 bar |
|---|---|---|---|---|---|---|---|
| 1 | 0 | 0 | 0 | 0 | 1 | 0 | 1 |
| 2 | 0 | 1 | 1 | 0 | 1 | 0 | 1 |
| 3 | 0 | 1 | 0 | 1 | 1 | 0 | 1 |
| 4 | 1 | 1 | 1 | 1 | 1 | 1 | 0 |
| 5 | 1 | 1 | 0 | 1 | 0 | 1 | 0 |
| 6 | 1 | 0 | 1 | 0 | 0 | 1 | 0 |

Figure 2:
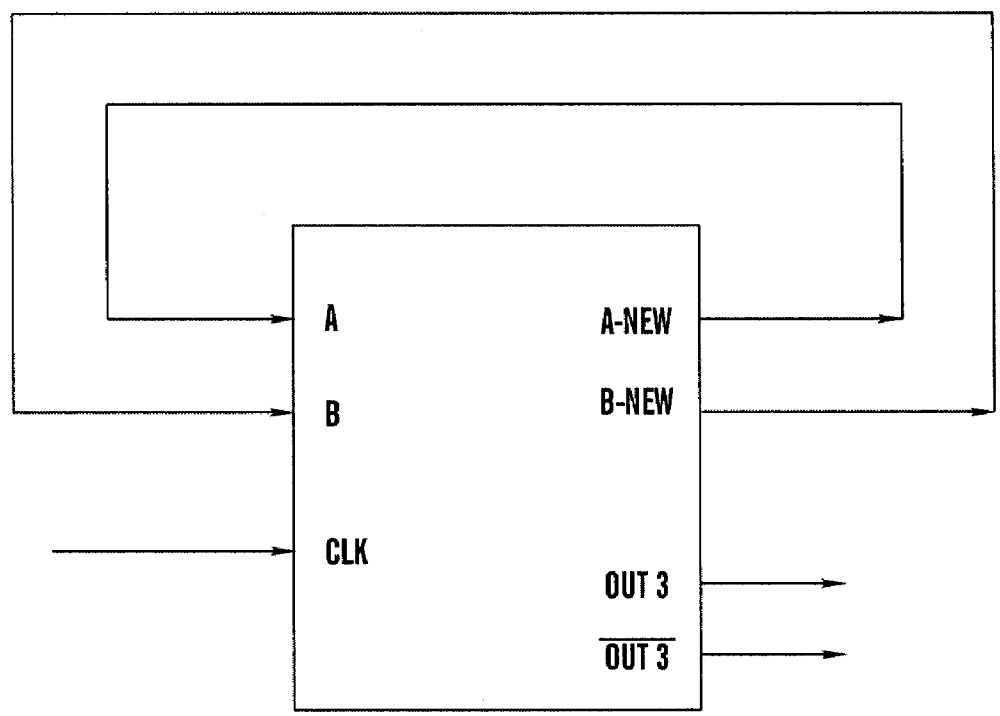
FIG. 2 is a schematic representation of the state machine function for the frequency divider circuit of FIG. 1.

FIG. 2 is a schematic representation of the state machine function for the frequency divider circuit 100 of FIG. 1. As is shown, the new values of the internal state variables (A, B) generated by the state machine (i.e., the next-state generator elements) are a function of the current values of A and B, as well as the current value of the input clock signal CLK. The output clock signal (Out 3) and its complement (Out 3 bar) are also shown in FIG. 2. It will be noted in this embodiment that the output clock signal Out 3 corresponds to the value of internal state variable A, and is derived by passing the value of A bar (as seen in FIG. 1) through a buffering inverter. Similarly, the complement output clock signal Out 3 bar corresponds to the value of A bar, and is derived by passing the value of A through a buffering inverter.

Figure 3A:
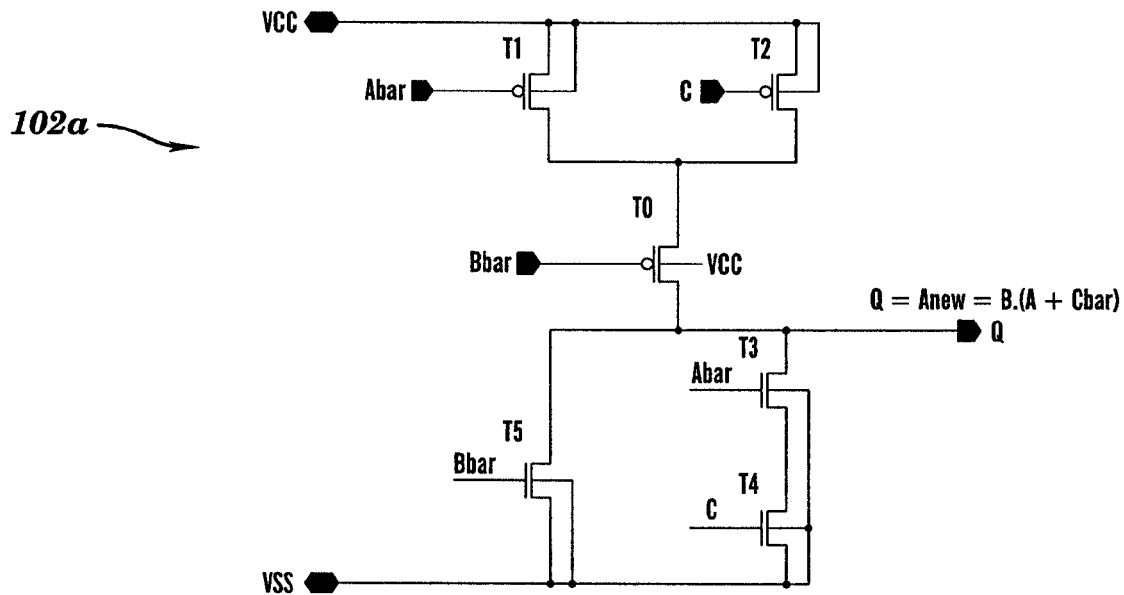
FIGS. 3(a) through 3(d) schematically illustrate the specific logical implementations of each of the next-state generator elements shown in FIG. 1.
Figure 3C:
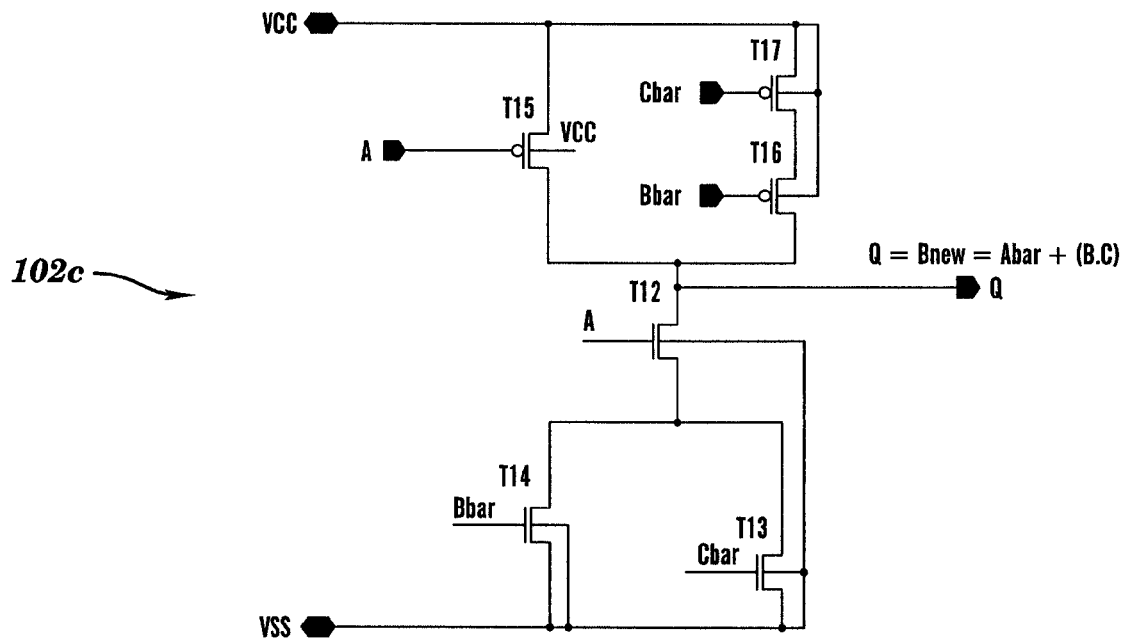
Figure 3B:
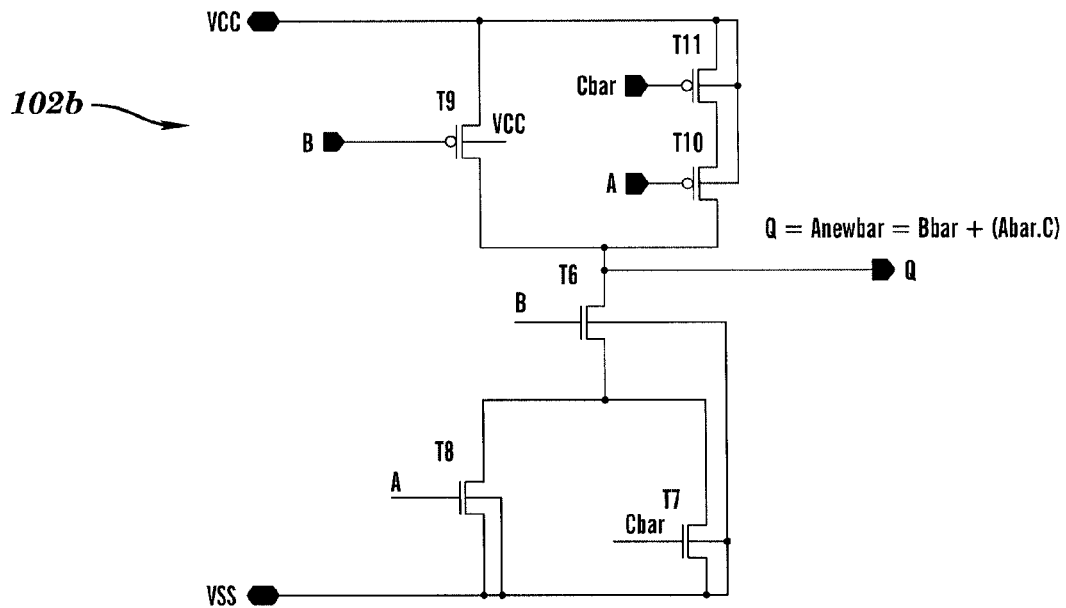
Figure 3D:
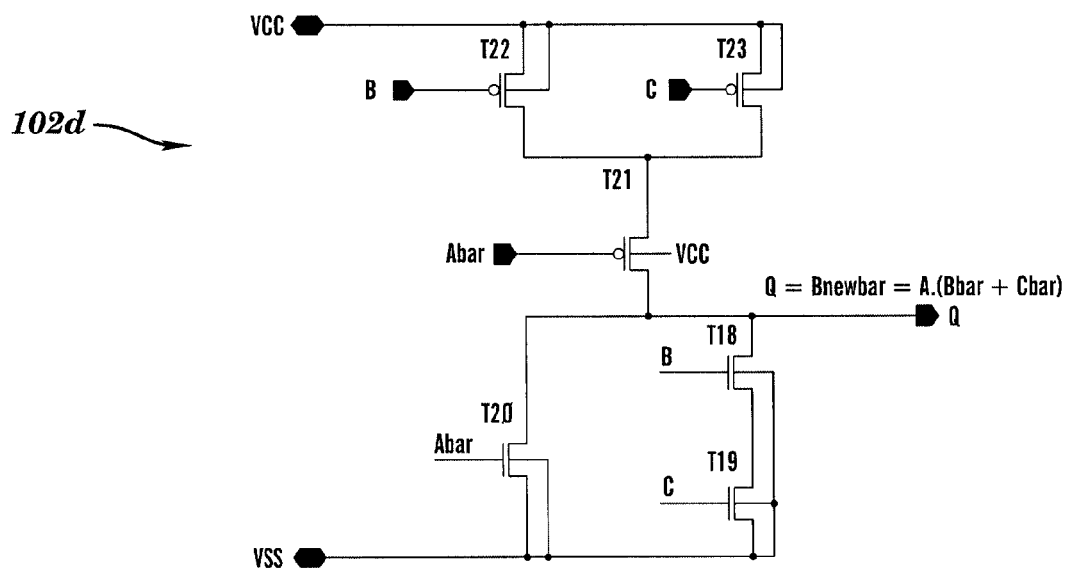

FIGS. 3(a) through 3(d) schematically illustrate the specific logical implementations of each of the four next-state generator elements 102 shown in FIG. 1. In particular, FIG. 3(a) is the state generator element 102a for generating A-New; FIG. 3(b) is the state generator element 102b for generating A-New bar; FIG. 3(c) is the state generator element 102c for generating B-New; and FIG. 3(d) is the state generator element 102d for generating B-New bar. As can be seen, the next-state generator elements are implemented using static CMOS logic design, using only six PFET/NFET devices per element. Again, the specific configuration of the next-state generator elements 102a–102d will be dependent on the chosen states and their order presented in the truth table.

Figure 4:
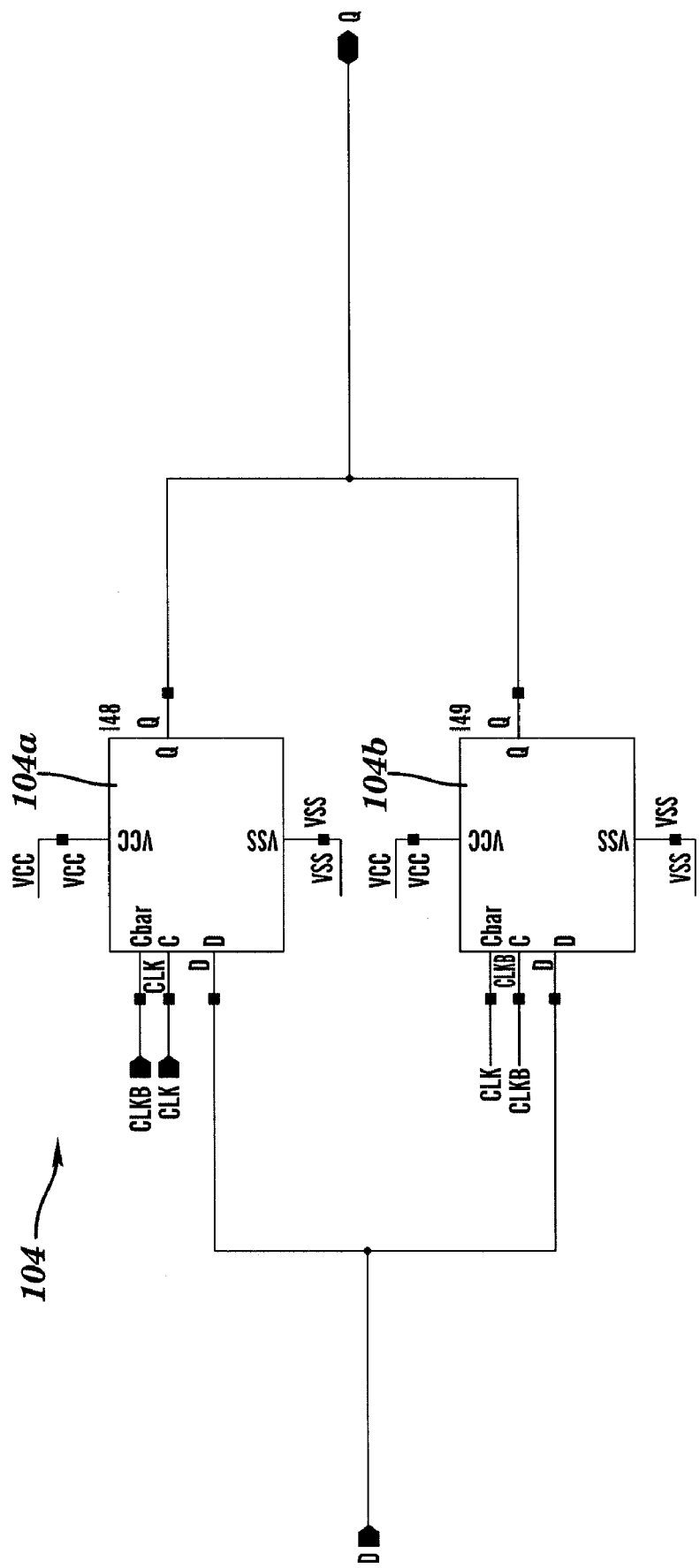
FIG. 4 is a schematic diagram of a specific implementation of the double edge triggered, D flip-flop element of FIG. 1.
Figure 5:
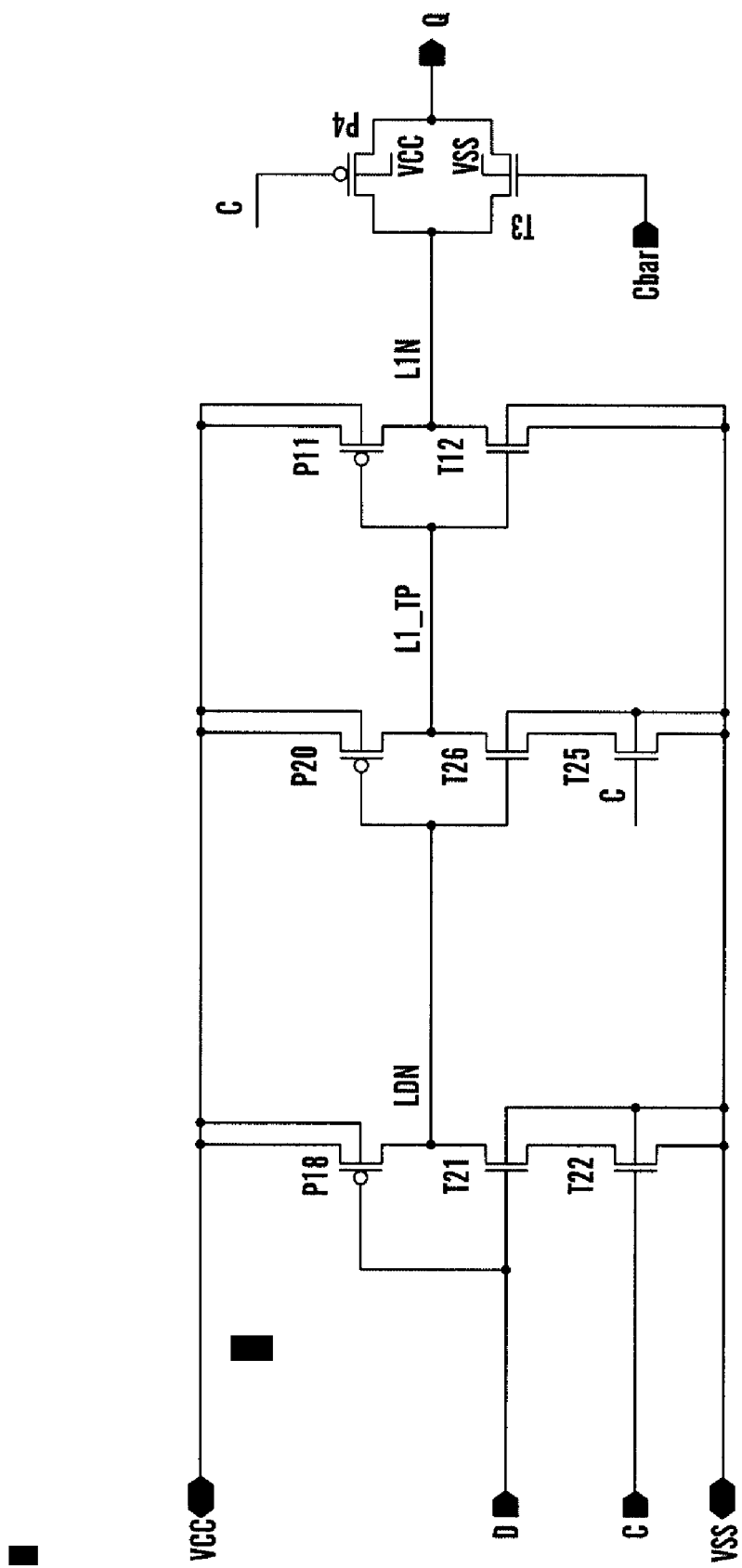
FIG. 5 schematically illustrates one of the individual D flip flops from FIG. 4 implemented as a positive edge triggered, D master/slave latch with reset capability.

Referring now to FIG. 4, there is shown a schematic diagram of a specific implementation of the double edge triggered, D flip-flop element 104 of FIG. 1. As is shown, the flip-flop element 104 includes a pair of D flip-flops 104a, 104b connected in parallel. Flip-flop 104a is configured to be triggered by the external input clock signal CLK, while Flip-flop 104b is configured to be triggered by the complement of CLK (i.e., CLK bar). Because the individual D flip-flops 104a, 104b are dynamic, master/slave flip-flops, static storage of a next-state variable (that would otherwise increase the delay of the flip-flop) is avoided, thereby enabling a higher frequency of operation capability. The individual D flip flops 104a, 104b, may be implemented, for example, as a positive edge triggered, D master/slave latch with reset capability as shown in FIG. 5.

Figure 6:
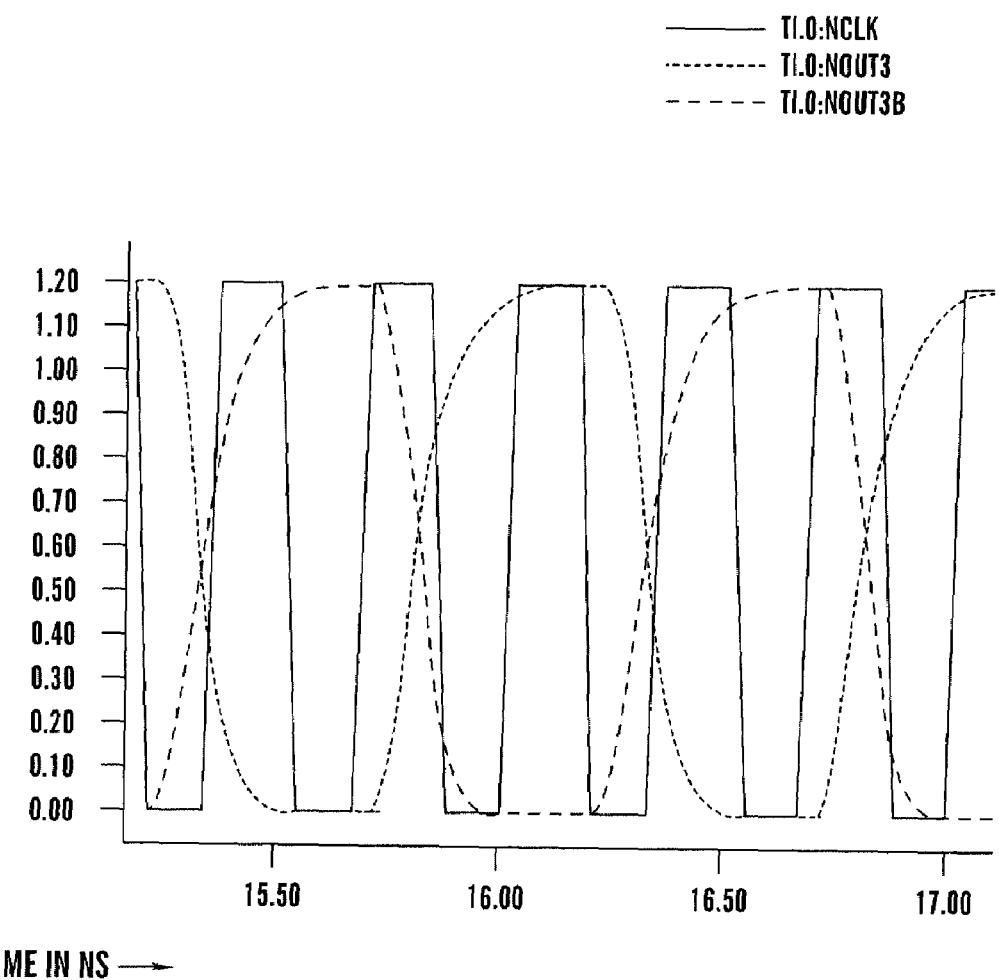
FIG. 6 is an exemplary waveform diagram for a 3 GHz input clock having a divide-by-3 output signal, in accordance with a further embodiment of the invention.

In operation, once CLK changes from 0 to 1, the input data D to the double edge flip-flop element 104 is stored in the master latch of flip-flop 104a (node L1_TP in FIG. 5), while the slave latch of flip-flop 104a is cut off. At the same time, the master latch of flip-flop 104b is cut off while the data stored in the slave latch of flip-flop 104b is transferred to output terminal Q. Conversely, when CLK transitions from 1 to 0, the roles are reversed; that is, the master latch of flip-flop 104b stores the data from D therein and the slave latch is cut off, while the master latch of flip-flop 104a is cut off and the slave latch releases the data therein to output Q. In this manner, double edge triggered operation is achieved. An exemplary waveform diagram for a 3 GHz input clock having a divide by 3 output signal is shown in FIG. 6.

With regard to the speed of operation of the frequency divider circuit 100, it will be understood that there are generally three factors that contribute to the total time needed for generation and storing of new states, and thus the upper limit of the frequency of operation. These factors include: the time taken for the slave latches in the flip-flop elements 104 to release the previously generated next-state data; the time taken for the new states to be generated by the generator elements 102; and the time taken for the presently generated new state data to be stored in the master latches in the flip-flop elements 104. This principle is more particularly illustrated in the timing diagram of FIG. 7.

Figure 7:
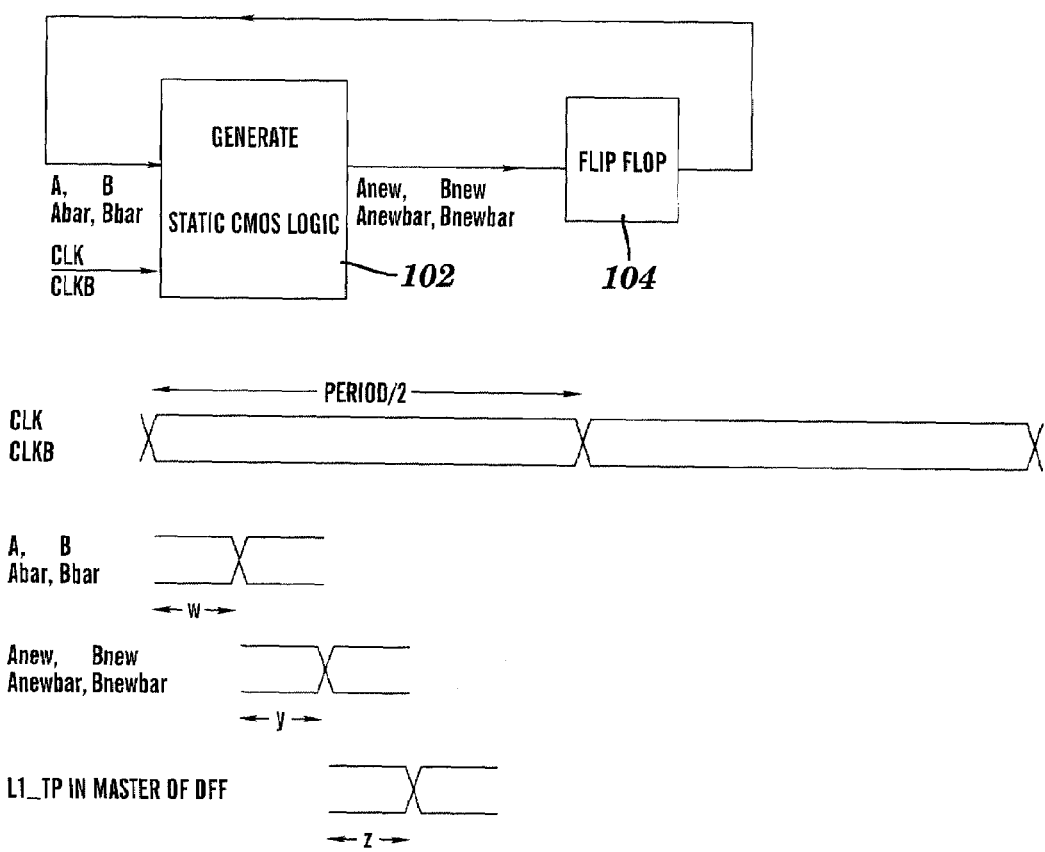
FIG. 7 is a timing diagram illustrating the factors that contribute to the total time needed for generation and storing of new states.

The upper portion of FIG. 7 is a simplified block diagram version of FIG. 1, excluding the reset elements, for reference purposes. As can be seen from the wave-forms therein, at the beginning of a given clock transition, the next-state generator 102 is configured to generate the next state values for the internal state variables A, B (and their complements), using the present values thereof and using the clock CLK. Before it can do so, however, the generator 102 has to first receive the present values of A, B (A bar and B bar) from the corresponding slave latches in the flip-flop elements 104. The time taken for this data to arrive is represented by "w" in FIG. 7. Once received, the generator 102 can then generate the new values, such as through the logic shown in FIG. 3(a)–3(d). However, since it takes a finite amount of time for those outputs to be generated through the CMOS devices, there is another time delay represented by "y" in FIG. 7. Finally, once the new state values are generated, they must still be stored within the master latches of the flip-flop elements 104. The time taken for this event is represented by "z" in FIG. 7.

Thus, the total delay associated with the present state retrieval, next state generation and storage operations is given by w+y+z. As such, the total half cycle time of the input clock signal must exceed w+y+z, thereby establishing an upper limit for the frequency of operation of the divider circuit 100. It stands to reason, therefore, that if one or more of the identified delay times w, y or z could be reduced, then the maximum operating frequency of the divider circuit can be increased. In this regard, it is helpful to review the truth table for a given state generator to see whether there are any "critical transitions" between states, in which at least one internal state variable changes, and wherein at least one new (next) value also changes as a result thereof.

For the above described divide-by-3 frequency divider, it will be seen that there are two "critical transitions" between the various states. Referring again to the truth table of Table 1, it is seen that in the transition from state 1 to state 2, the value of B changes from 0 to 1. However, since both A-New and B-New maintain their respective values, this is not considered a critical transition. Going from state 2 to state 3, neither A nor B change, so again this is not a critical transition. Going from state 3 to state 4, A-New and B-New do not change, so it is not a critical transition. Going from state 4 to state 5, A and B remain the same, so it is not a critical transition.

However, going from state 5 to state 6, it is seen that as B changes from 1 to 0, A-New also changes from 1 to 0. This is therefore a critical transition to be further analyzed. Finally, going from state 6 to state 1, variable A changes from 1 to 0, while B-New changes from 0 to 1. This is a second critical transition of the device.

Once the critical transitions are identified, it is useful to then analyze the corresponding generator circuit to see how the transition of the new-state variable is implemented. In the example illustrated, the first critical transition is identified from state 5 to state 6, where a change in the value of B results in a change in A-New. An inspection of the A-New generation circuit shown in FIG. 3(a) reveals that this change is carried out by the following action: because B changes from 1 to 0, B-bar therefore changes from 0 to 1. B-bar is coupled to the gate of NFET T5 of FIG. 3(a), thereby discharging Q to $V_{SS}$ through T5. Since the change in voltage for A-New is effected through just a single transistor, there is no substantial time improvement to be made in this regard. However, for higher order divide-by-N circuits, there are more transistors used in the individual generator circuits and thus a critical transition path may be through several transistors which would add to the overall delay, as will be demonstrated later.

The second critical transition in this example is from state 6 to state 1, where a change in the value of A results in a change in B-New. An inspection of the B-New generation circuit shown in FIG. 3(c) reveals that this change is carried out by the following action: because A changes from 1 to 0, PFET T15 of FIG. 3(c) is rendered conductive, thereby pulling up Q to $V_{CC}$ through T15. Again, since the change in voltage for B-New is effected through just a single transistor, there is no substantial time improvement to be made in this regard.

The above described state machine approach may be applied to higher divide ratios, as indicated earlier. For example, Table 2 below is a truth table for an implementation of divide by 7 frequency divider circuit. Since there are a total of 14 states, there are four total state variables required. Thus, a third internal state variable, D, is introduced. Again, the order of the states is preferably selected so as to simplify (to the extent possible) the resulting next-state generator circuits in terms of the number of devices used therein. It will be recognized, however, that the functions generating the next-state variables for the divide by 7 divider will be more complex than those for the divide by 3 divider.

TABLE 2

| State | A | B | D | Clk | Anew | Bnew | Dnew | Out7 | Out7 bar |
|-------|---|---|---|-----|------|------|------|------|----------|
| 1  | 0 | 0 | 1 | 0 | 0 | 0 | 1 | 0 | 1 |
| 2  | 0 | 0 | 1 | 1 | 0 | 0 | 0 | 0 | 1 |
| 3  | 0 | 0 | 0 | 0 | 0 | 0 | 0 | 0 | 1 |
| 4  | 0 | 0 | 0 | 1 | 0 | 1 | 1 | 0 | 1 |
| 5  | 0 | 1 | 1 | 0 | 0 | 1 | 1 | 0 | 1 |
| 6  | 0 | 1 | 1 | 1 | 0 | 1 | 0 | 0 | 1 |
| 7  | 0 | 1 | 0 | 0 | 1 | 1 | 0 | 0 | 1 |
| 8  | 1 | 1 | 0 | 1 | 1 | 1 | 1 | 1 | 0 |
| 9  | 1 | 1 | 1 | 0 | 1 | 1 | 1 | 1 | 0 |
| 10 | 1 | 1 | 1 | 1 | 1 | 1 | 0 | 1 | 0 |
| 11 | 1 | 1 | 0 | 0 | 1 | 0 | 0 | 1 | 0 |
| 12 | 1 | 0 | 0 | 1 | 1 | 0 | 1 | 1 | 0 |
| 13 | 1 | 0 | 1 | 0 | 1 | 0 | 1 | 1 | 0 |
| 14 | 1 | 0 | 1 | 1 | 0 | 0 | 1 | 1 | 0 |

FIGS. 8(a) through 8(f) schematically illustrate the specific logical implementations for each of the six next-state generator elements in the divide by 7 divider (three for A-New, B-New and D-New, and three for the complements thereof). As can be seen, each generator circuit includes a larger number of CMOS devices than compared to the divide by 3 circuits.

Figure 8A:
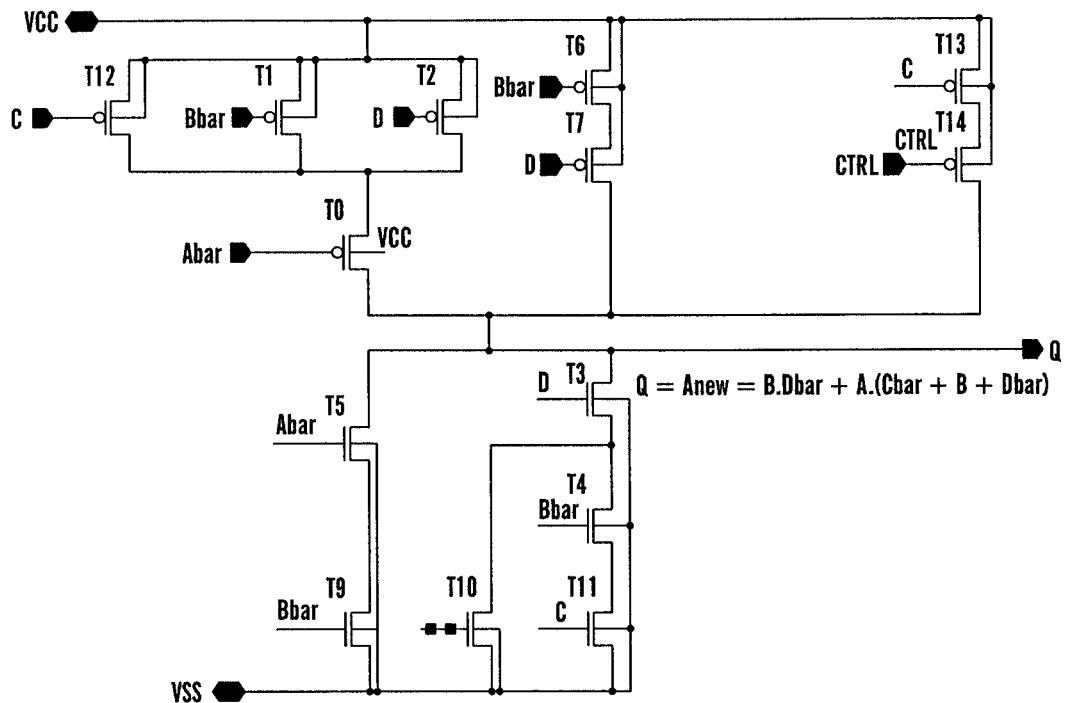
FIGS. 8(a) through 8(f) schematically illustrate the specific logical implementations for each of the six next-state generator elements in a divide-by-7 divider, in accordance with a further embodiment of the invention.

Considering once again the issue of delay, Table 2 may be inspected to determine which state transitions possibly constitute "critical transitions" (i.e., those transitions in which at least one new value changes from the previous state as a result of at least one internal state variable changing from the previous state). One such example of a critical transition in Table 2 is from state 6 to state 7. In this transition, internal state variable D switches from 1 to 0, while A-New switches from 0 to 1. Turning to FIG. 8(a), an inspection of the circuitry therein reveals that the change in value from D from 1 to 0 causes NFET T3 to shut off, while PFET T7 is rendered conductive. Since B bar remains low from the previous state, a conductive path is completed through T6 and T7 to pull up A-New to 1. However, this transition involves a circuit path through a pair of transistors, one of which (T7) requires receiving the present value of D from the flip-flop device. As a result, there is an additional delay associated with this transition.

Figure 8B:
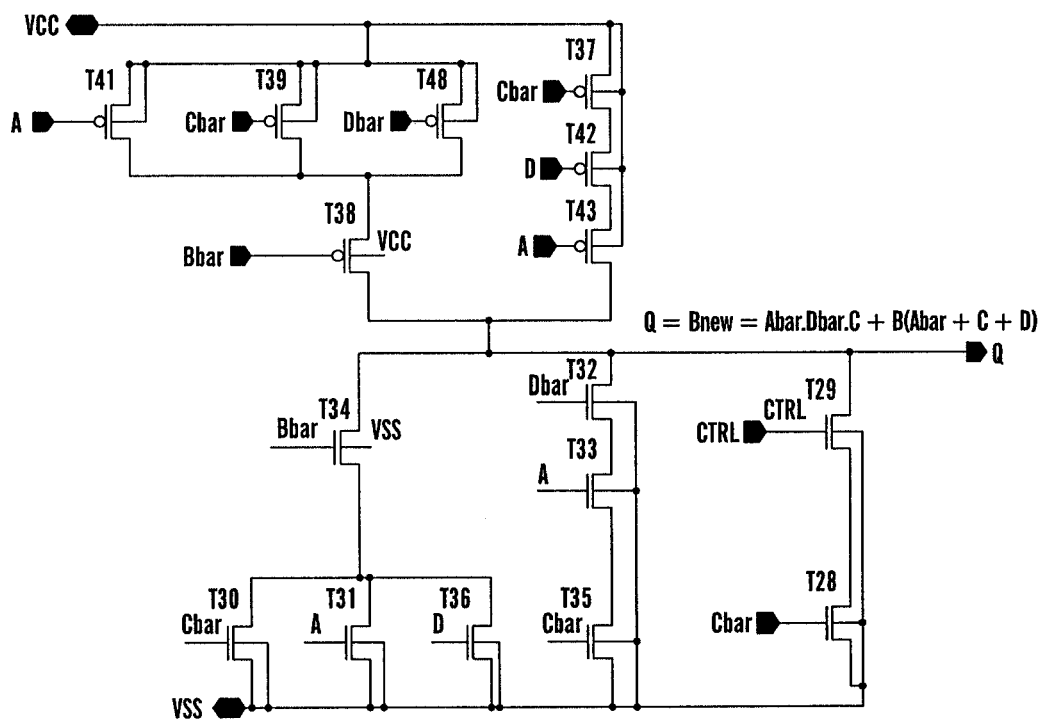
Figure 8C:
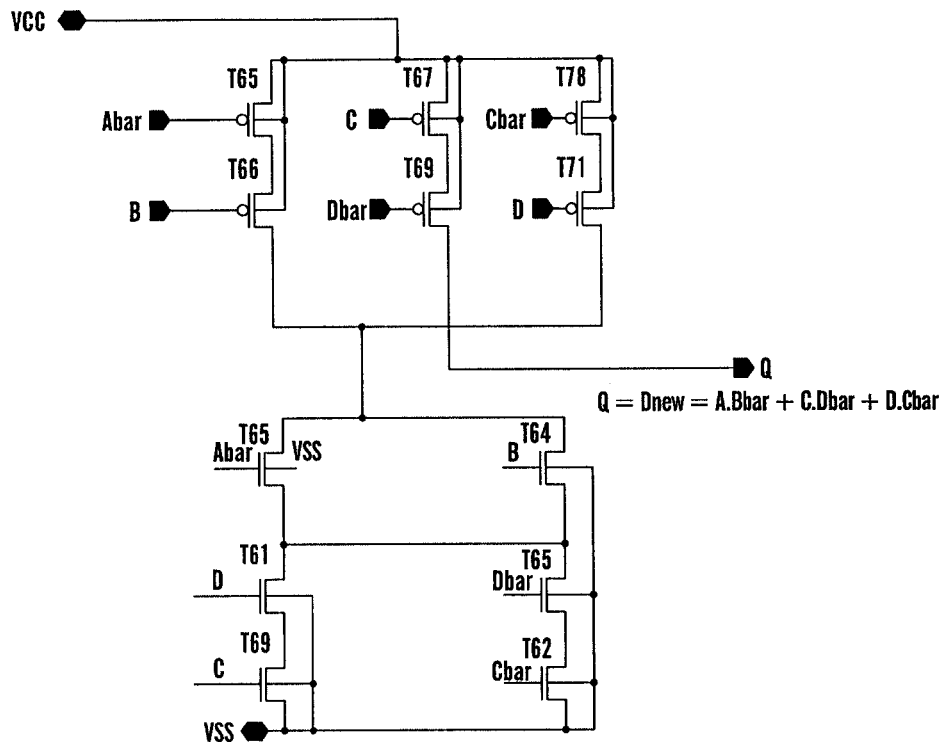
Figure 8D:
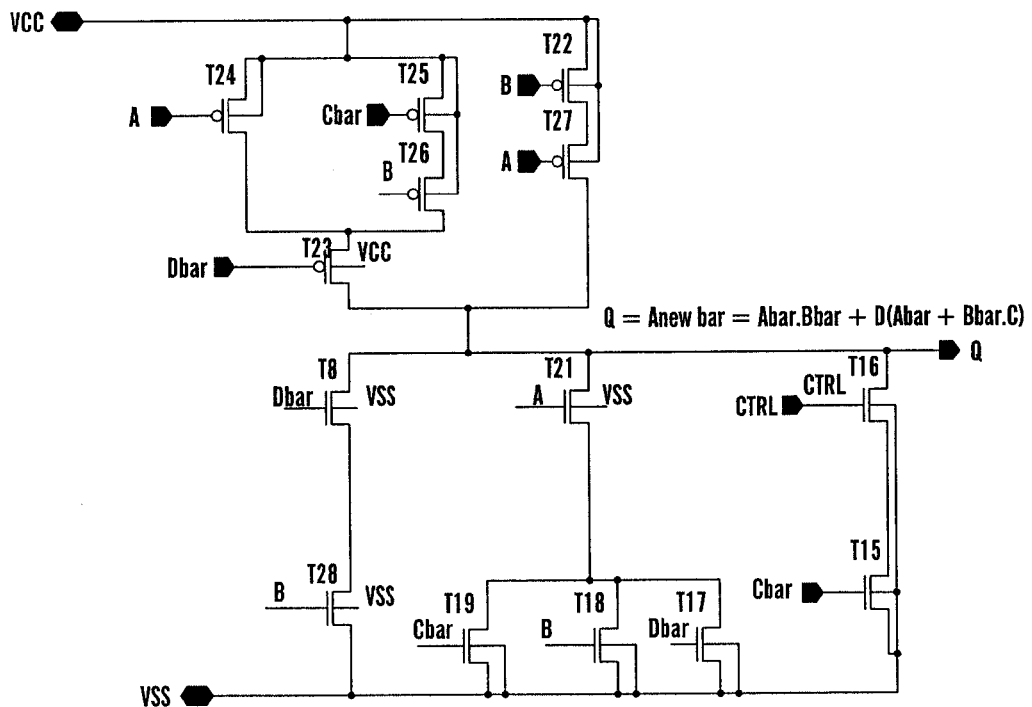
Figure 8E:
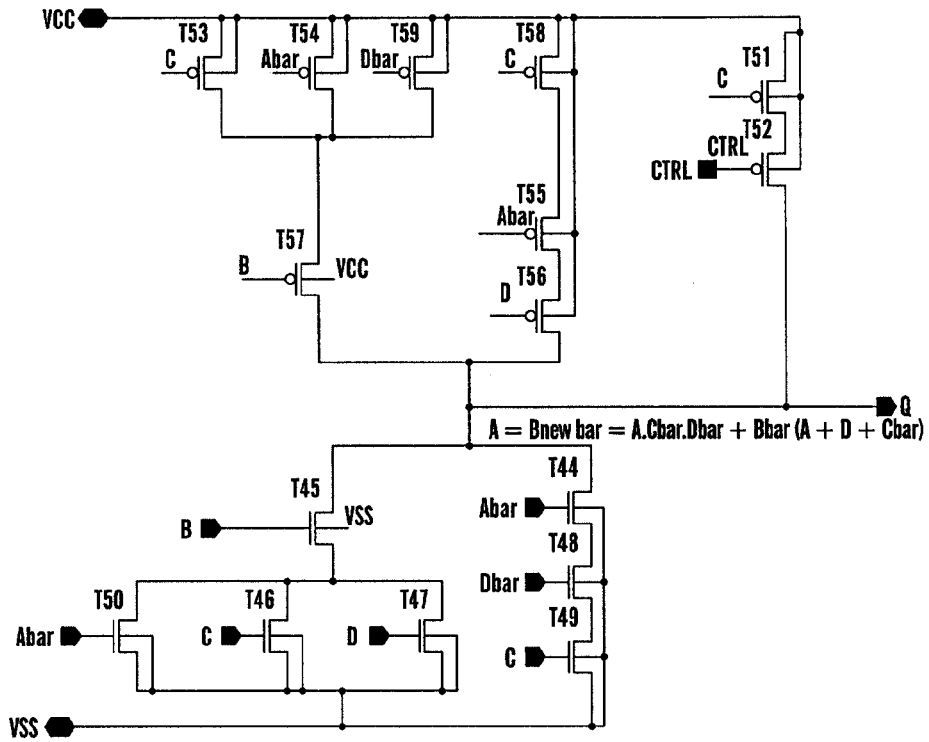
Figure 8F:
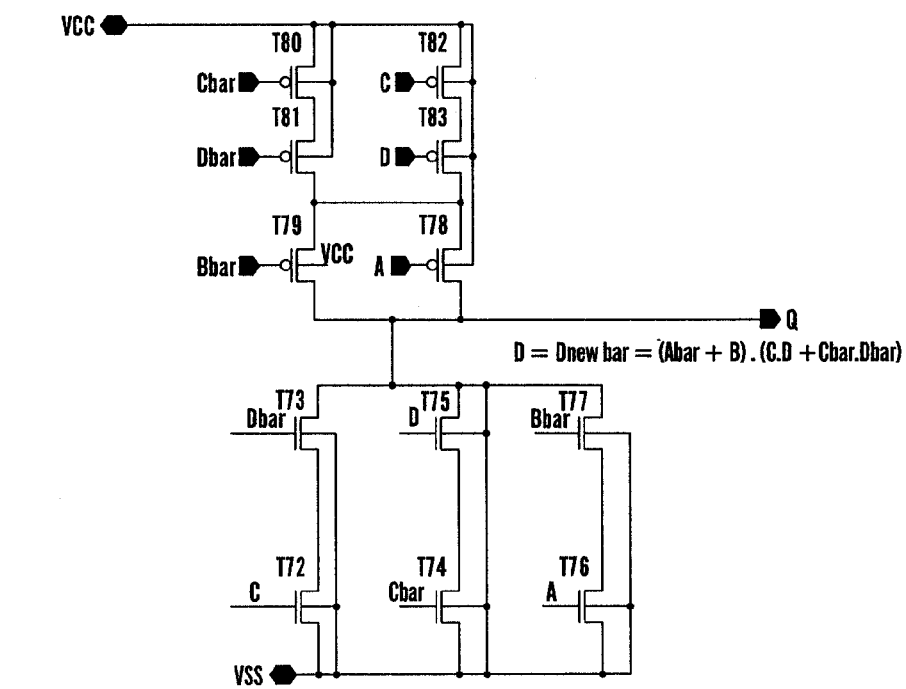

The other identifiable "critical transition" from Table 2 is from state 10 to state 11, during which a change in D from 1 to 0 results in a change in B-New from 1 to 0. As shown in FIG. 8(b), when D goes from 1 to 0 (and D bar goes from 0 to 1), NFET T32 is rendered conductive. NFET T33 is already in a conductive state, since the value of A is 1 in both states 10 and 11. In addition, CLK bar transitions from 0 to 1, thereby activating T35 and completing a pull down path for B-New once the value of D bar is received at T32. Again, there is a delay associated with receiving D bar from the corresponding slave latch.

Therefore, in accordance with a further embodiment of the invention, there is disclosed an additional apparatus configured within one or more of the next-state generator elements that effectively generates a "preactivated" internal state variable, such that when a critical transition is reached (to state X+1), the internal state variable causing this transition is effectively activated during the previous state (state X). In effect, additional logic is used to detect state X, such that the generation of the causal internal state variable is immediately available upon the transition to state X+1.

Figure 9A:
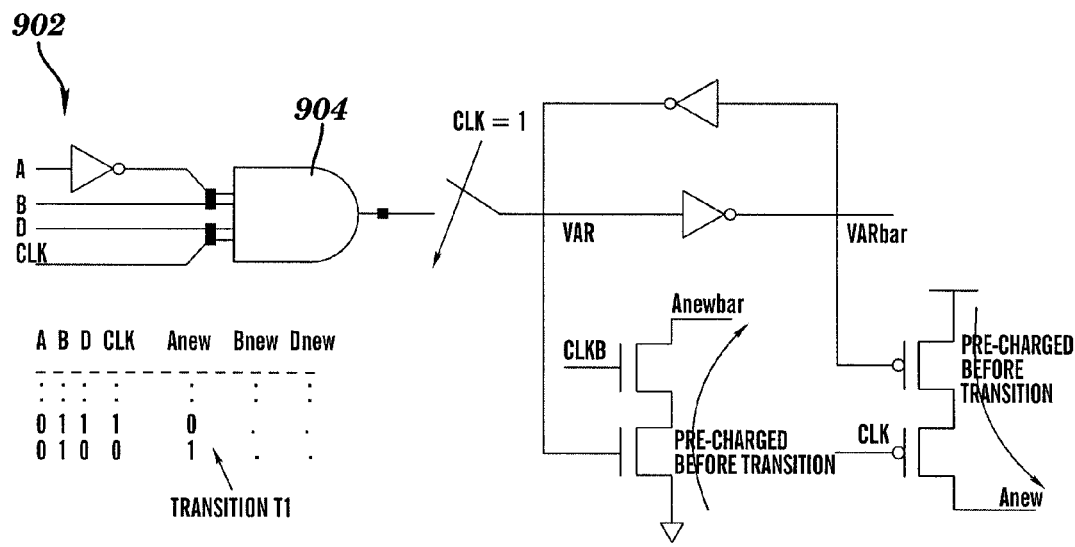
FIGS. 9(a) and 9(b) are schematic diagrams of a logic element for pregenerating an internal state variable, in accordance with a further embodiment of the invention.

For example, FIG. 9(a) is a schematic diagram of a logic element 902 for pregenerating an internal state variable, specifically for generating A-New and A-New bar upon detection of state 6 in Table 2. In other words, logic element 902 is configured to detect the state at which the values of (A, B, D, CLK) correspond to (0, 1, 1, 1), respectively. This is implemented by AND gate 904 having A bar, B, D and CLK as inputs thereto. Accordingly, the output of AND gate 904 is high only during state 6. In addition, whenever the value of CLK is 1, the output of AND gate 904 is coupled to one side of pair of cross coupled inverters at node VAR. The node at the other side of the inverter pair is labeled VAR bar. By using the latched signal at VAR and VAR bar to precharge an NFET and PFET, respectively, the internal state variables A-New bar and A-New will be available as soon as the value of CLK changes at the state. Therefore, the change in A-New for state 7 (0 to 1) occurs as soon as CLK changes from 1 to 0 without being dependent on receiving the new value of D.

Figure 9B:
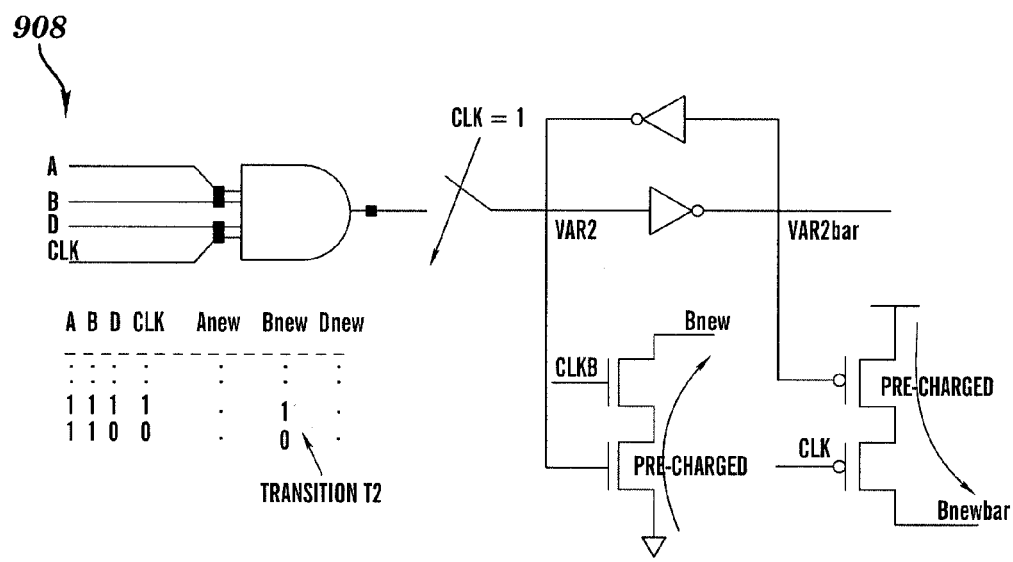

FIG. 9(b) is a schematic diagram of another logic element 908 similar to that of FIG. 9(a), but specifically configured to recognize state 10 of Table 2, where (A, B, D, CLK) corresponds to (1, 1, 1, 1). Thus, during state 10, a precharge signal VAR2 and VAR2 bar is stored within the cross coupled inverter latch and applied to an NFET in the B-New generation circuit, as well as a PFET in the B-New bar generation circuit. Accordingly, during state 11, the change in the input clock signal results in an immediate change in B-New from 1 to 0, independent of state variable D. By eliminating the wait time (w) for receiving the new value of a state variable that in turn causes a change in the value of the next state of another state variable, an increase in the overall operating speed of the input frequency of about 500 MHz is achievable.

It should also be pointed out that additional time may be saved through pregenerating logic elements like those shown in FIGS. 9(a) and 9(b) for situations where a critical transition path involves several transistors controlled by switching state variables (excluding the clock controlled transistor). In other words, the "y" component of the delay can also be reduced for certain worst case scenarios. Because the critical transitions for the exemplary divide-by-7 device described above only include signal paths through two transistors (including the clock controlled transistor), the "y" component is already at a minimum due to the logic itself. However, it will be appreciated that different truth tables (and thus different next state generation circuitry) can be implemented to achieve the same frequency divide function. Thus, for a divider having a total of four state variables (i.e., divide-by-N=5, 6, 7 or 8), there can be from 1 to 4 transistors in the critical signal path that are controlled by a changing internal state variable.

Figure 10A:
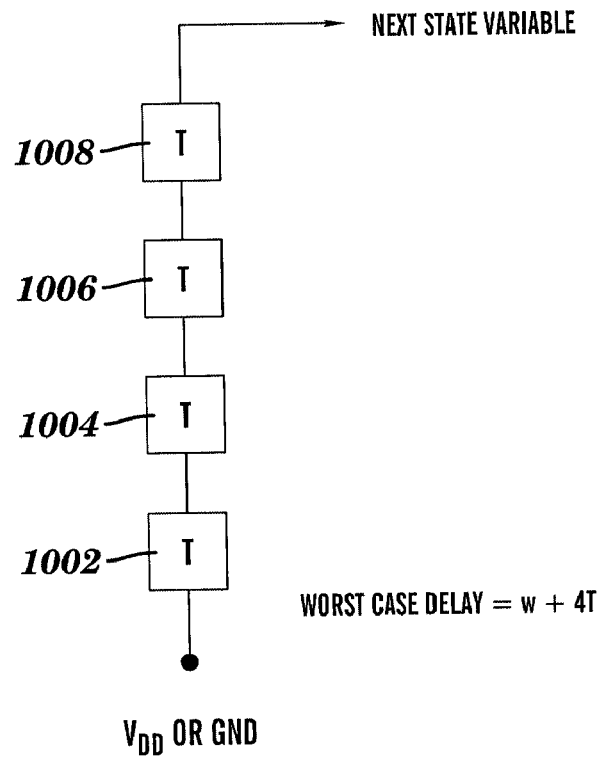
FIG. 10(a) is a schematic diagram depicting a worst case signal path delay for a frequency divider having 4 state variables.

The additional time savings is schematically represented in FIG. 10(a). In a "worst case" scenario, there are four transistors in the critical signal path between a logic supply rail (VDD or ground) and the output of the next state variable, as represented by blocks 1002, 1004, 1006, 1008. In this case, the worst total delay associated with this logic is the delay of the slave latch in producing the current state variable(s), w, plus the total delay component, y, of each of the four transistors. With four transistors each having an individual delay (T) associated there with, the total y component of the delay is equal to 4T. Thus, the total worst case delay for a divide-by 5 through 8 divider at a state transition is w+4T.

Figure 10B:
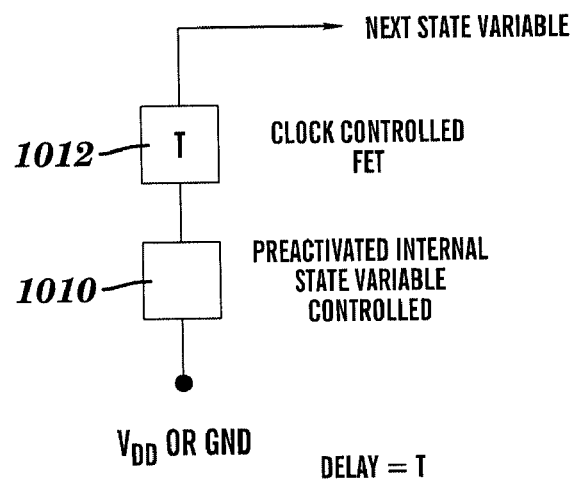
FIG. 10(b) is a schematic diagram depicting the delay improvement for the device of FIG. 10(a) using a logic element for pregenerating an internal state variable.

In contrast, the preactivated internal state variable device disclosed herein is represented by block 1010 in FIG. 10(b). The other block 1012 represents a clock-controlled FET, whose delay will still be present. However, by having the preactivated internal state variable, not only is the "w" component of the delay eliminated, but the delay of 3 of the 4 transistors in the critical signal path is also eliminated. In other words, the total delay upon state transition is now just 1T. As such, for a frequency divider having a total of 4 state variables, a frequency improvement of 1/(w+3T) Hz is possible.

Figure 11A:
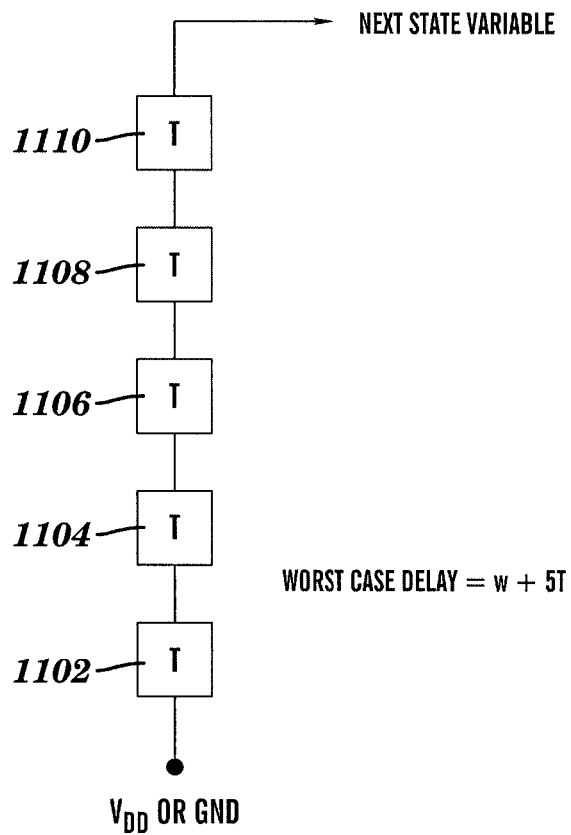
FIG. 11(a) is a schematic diagram depicting a worst case signal path delay for a frequency divider having 5 state variables.
Figure 11B:
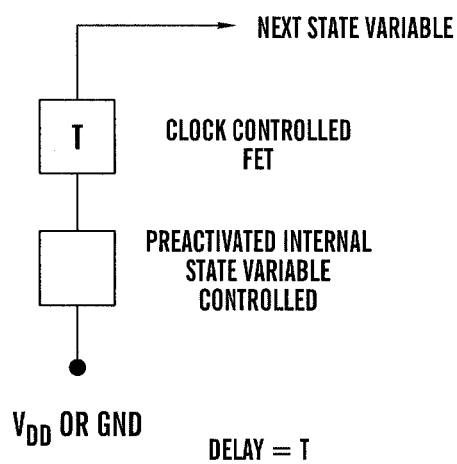
FIG. 11(b) is a schematic diagram depicting the delay improvement for the device of FIG. 11(a) using a logic element for pregenerating an internal state variable.

Furthermore, the greater number of state variables used in a frequency divider, the greater the theoretical improvement in the delay becomes. FIG. 11(a) is a schematic diagram similar to FIG. 10(a), only for a divider circuit with a total of 5 state variables and 4 internal state variables (i.e., divide-by-N=9 through 16). Since in this case there can be anywhere from 1 to 5 transistors 1102, 1104, 1106, 1108, 1110 in the critical signal path, the worst case delay would be equal to w+5T. Again, as shown in FIG. 11(b), the present invention embodiments allow for a reduction in the delay to 1T, since the preactivated state variable device will both eliminate the "w" component of the delay, as well as eliminate the delay associated with 4 of the 5 signal path transistors. It will be seen, therefore, that for a frequency divider having a total of X transistors in the critical delay path, the use of a preactivated state variable device can provide a frequency improvement of up to 1/(w+(X−1)T). It will further be noted that actual number, X, of transistors in the critical path may be less than the total number of state variables used by the divider circuit, depending on the degree of optimization of the circuit design itself.

Thus configured, the above described divide-by-N frequency dividers provide a low-power, high-frequency divider circuit that provides a pair of complementary, frequency divided outputs having a 50% duty cycle. A state machine approach allows for relatively low power consumption, as well as the flexibility of providing odd numbered divisors. Furthermore, the state machine approach is expandable in that a circuit block for each desired individual divisor value may be configured. Alternatively, only divisors of prime numbers such as 2, 3, 5, 7, 11, etc. can be configured, while other divisors can be realized by cascading the dividers (e.g., a divide-by-3 followed by a divide-by-5 to provide a divide-by-15).

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A digital frequency divider apparatus, comprising:
a plurality of next-state generator elements receiving an input clock signal thereto, and configured to generate a next value for each of a corresponding plurality of internal state variables;
a plurality of flip-flop elements configured to store said generated next values for said plurality of internal state variables, said flip-flop elements further comprise comprising double edge triggered, D flip-flop elements;
said plurality of flip-flop elements further configured to provide a present value of said plurality of internal state variables to said next-state generator elements through a feedback path therebetween;
wherein said generated next value for said plurality of internal state variables are based upon said present values of said plurality of internal state variables and said input clock signal.

2. The apparatus of claim 1, further comprising a reset element associated with each of said next-state generator elements, said reset element configured for setting said internal state variables and their complements to a desired initial value.

3. The apparatus of claim 1, wherein said double edge triggered, D flip-flop elements further comprise a pair of D flip-flops connected in parallel.

4. The apparatus of claim 1, wherein said next-state generator elements are implemented with CMOS logic.

5. A digital frequency by N divider apparatus, comprising:
plurality of next-state generator elements receiving an input clock signal thereto, and configured to generate a next value for each of a corresponding plurality of internal state variable;
a plurality of flip-flop elements configured to store said generated next values for said plurality of internal state variables;
said plurality of flip-flop elements further configured to provide a present value of said plurality of internal state variables to said next-state generator elements through a feedback path therebetween;
said generated next values for said plurality of internal state variables based upon said present values of said plurality of internal state variables and said input clock signal; and
one or more of said next-state generator elements further configured to generate a preactivated internal state variable prior to a transition from state X to state X+1, wherein during said transition at least one of said internal state variable changes, and wherein at least one of said next value also changes as a result thereof;
wherein said one or more of said next-state generator elements configured to generate a preactivated internal state variable further comprising:
logic configured to detect state X;
a latch mechanism coupled to an output of said logic, said latch mechanism configured to precharge a transistor device such that a preactivated internal state variable is realized immediately upon a change in said input clock signal at state X+1.

6. The apparatus of claim 5, further comprising a reset element associated with each of said next-state generator elements, said reset element configured for setting said internal state variables and their complements to a desired initial value.

7. The apparatus of claim 5, wherein said flip-flop elements further comprise double edge triggered, D flip-flop elements.

8. The apparatus of claim 7, wherein said double edge triggered, D flip-flop elements further comprise a pair of D flip-flops connected in parallel.

9. The apparatus of claim 5, wherein said next-state generator elements are implemented with CMOS logic.

10. A method for dividing the frequency of an input clock signal, the method comprising:
configuring a plurality of next-state generator elements to generate a next value for each of a corresponding plurality of internal state variables;
configuring a plurality of flip-flop elements for storing said generated next values for said plurality of internal state variables, said flip-flop elements further comprising double edge triggered, D flip-flop elements;
said plurality of flip-flop elements further configured to provide a present value of said plurality of internal state variables to said next-state generator elements through a feedback path therebetween;
wherein said generated next values for said plurality of internal state variables are based upon said present values of said plurality of internal state variables and the input clock signal.

11. The method of claim 10, further comprising configuring a reset element associated with each of said next-state generator elements, said reset element configured for setting said internal state variables and their complements to a desired initial value.

12. The method of claim 10, wherein said double edge triggered, D flip-flop elements further comprise a pair of D flip-flops connected in parallel.

13. The method of claim 10, wherein said next-state generator elements are implemented with CMOS logic.

14. The method of claim 10, further comprising:
determining a transition from state X to state X+1, wherein during said transition at least one of said internal state variable changes, and wherein at least one of said next value also changes as a result thereof; and
using one or more of said next-state generator elements to generate a preactivated internal state variable prior to state X+1.

15. The method of claim 14, further comprising:
detecting state X; and
precharging a transistor device such that a preactivated internal state variable is realized immediately upon a change in said input clock signal at state X+1.

* * * * *